Jan. 9, 1968 L. W. BLUEMLE, JR 3,362,540
DISC-SHAPED, MULTIPLE CONE TYPE DIALYZER HAVING
A TAPERED FLOW PATH
Filed Aug. 24, 1966 4 Sheets-Sheet 1
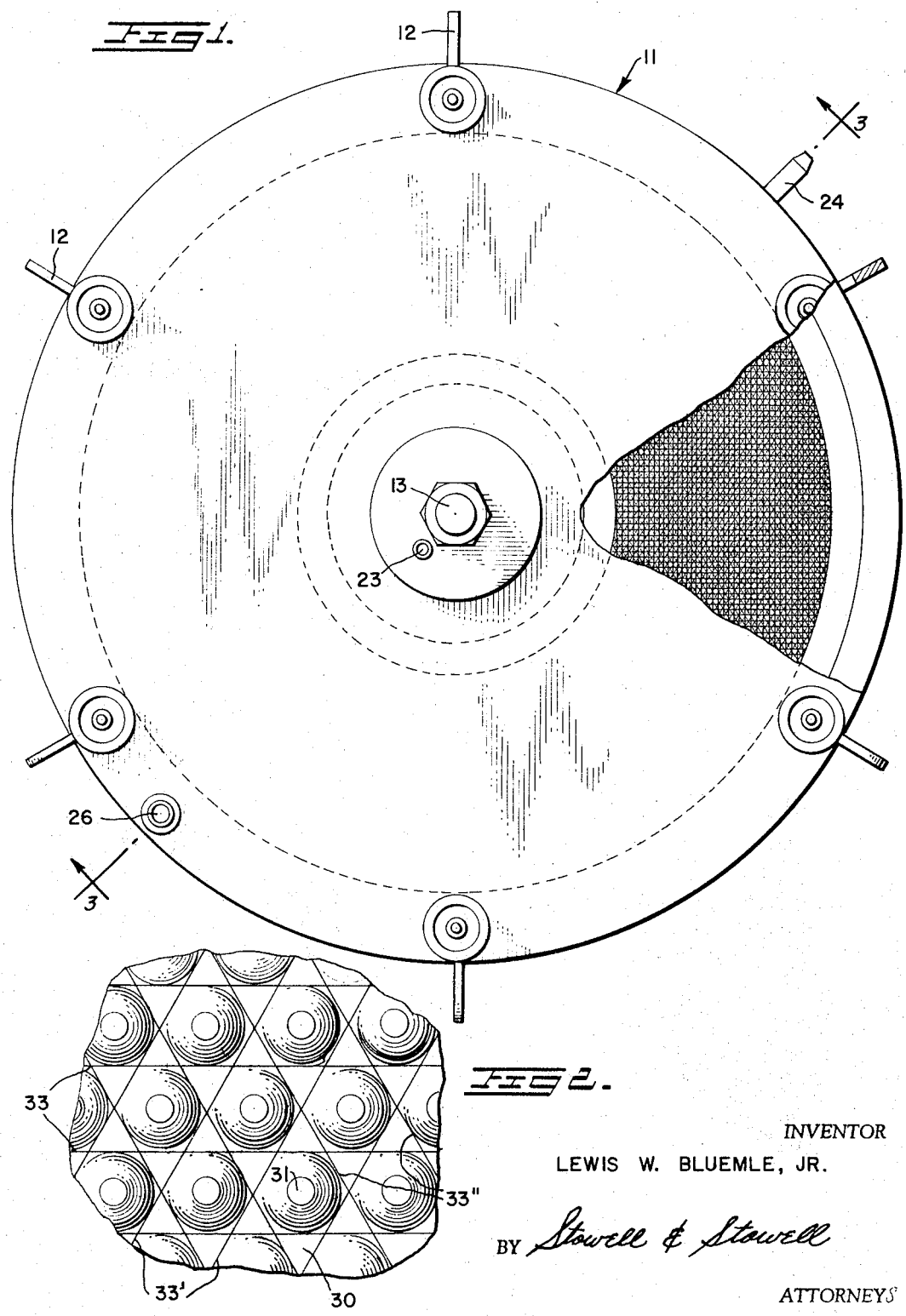
INVENTOR
LEWIS W. BLUEMLE, JR.
BY *Stowell & Stowell*
ATTORNEYS

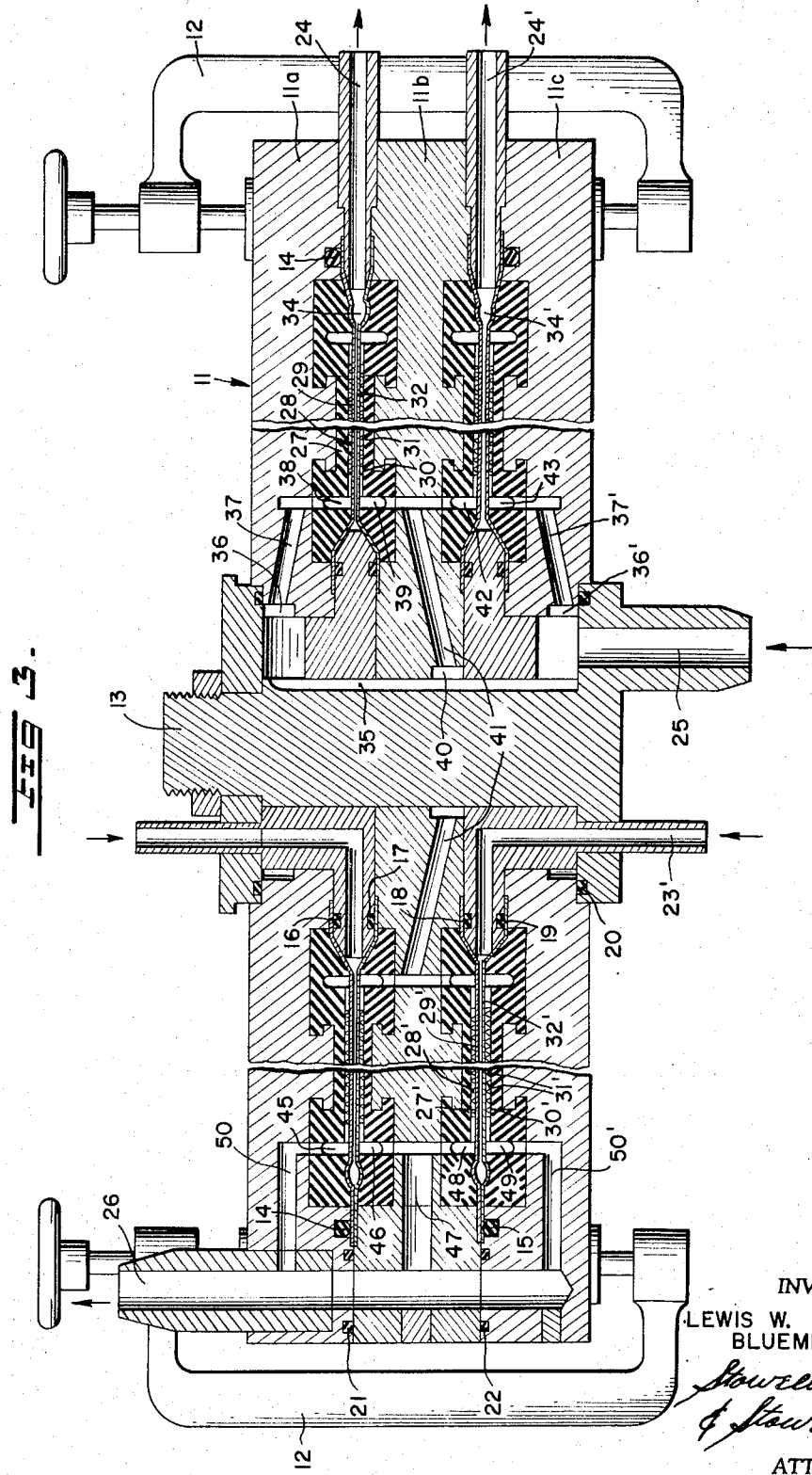

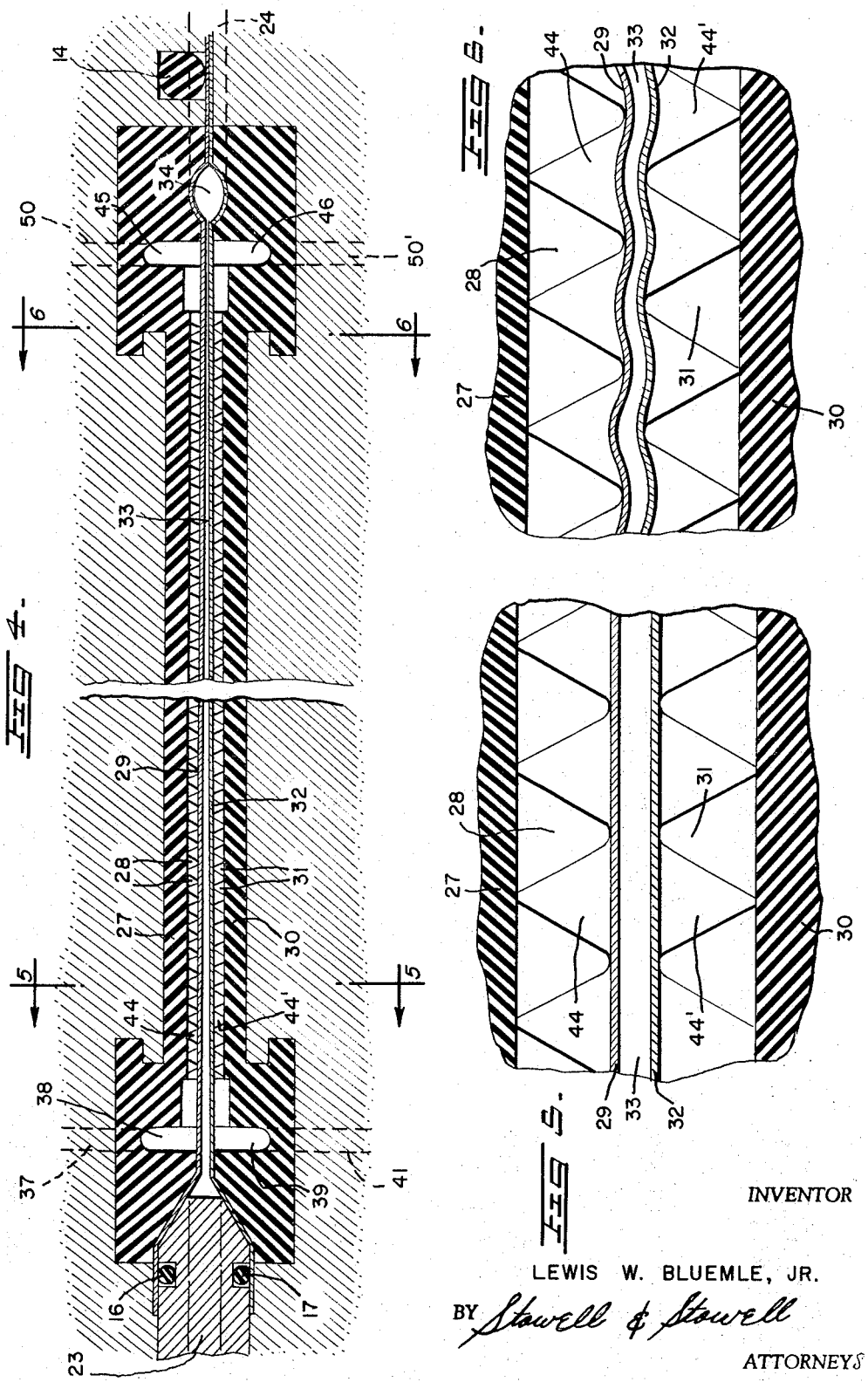

Jan. 9, 1968     L. W. BLUEMLE, JR     3,362,540
DISC-SHAPED, MULTIPLE CONE TYPE DIALYZER HAVING
A TAPERED FLOW PATH
Filed Aug. 24, 1966     4 Sheets-Sheet 4
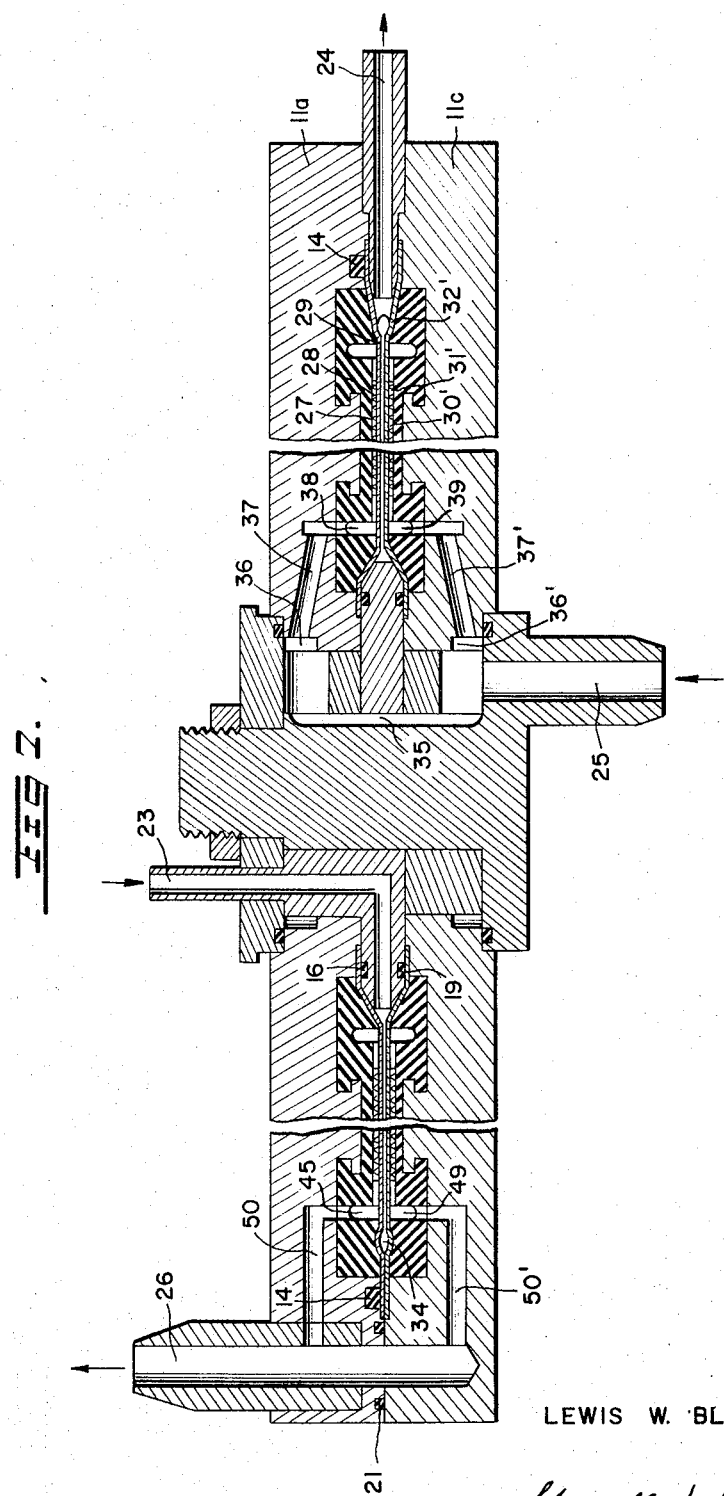
INVENTOR
LEWIS W. BLUEMLE, JR.
BY *Stowell & Stowell*
ATTORNEYS United States Patent Office 3,362,540
Patented Jan. 9, 1968

3,362,540
DISC-SHAPED, MULTIPLE CONE TYPE DIALYZER HAVING A TAPERED FLOW PATH
Lewis W. Bluemle, Jr., Philadelphia, Pa., assignor, by mesne assignments, to Research Corporation, New York, N.Y., a non-profit corporation of New York
Filed Aug. 24, 1966, Ser. No. 574,699
5 Claims. (Cl. 210—321)

ABSTRACT OF THE DISCLOSURE

A dialysis apparatus suitable for use in an artificial kidney or artificial lung device comprising a housing, a pair of opposed generally disc-shaped members mounted in said housing, a plurality of spaced cone-shaped elements projecting from the opposed faces of the disc-shaped members, a pair of generally disc-shaped semi-permeable membranes mounted in said housing and supported by the cone-shaped elements to define a first narrow space between the membranes tapering from the center radially outwardly (broadest near the inlet, narrowest near the outlet) and a second pair of spaces between the outer surfaces of the pair of membranes and the disc-shaped members, first fluid inlet and outlet means in said housing communicating only with the said first space defined by the said membranes adapted for the radially outward flow of a first fluid, and second fluid inlet and outlet means in said housing communicating only with the said second spaces about the said cone-shaped members adapted for the radially outward flow of a second fluid.

---

This invention relates to a dialysis apparatus. In one specific aspect, it relates to a dialysis apparatus particularly adapted for use in the dialysis of blood. In another more specific aspect, it relates to a dialysis apparatus useful in artificial kidney and artificial lung devices.

An artificial kidney device contains a dialyzer interposed in the blood circulation of a patient whose kidneys have been removed or are otherwise inadequate. Blood circulates through the dialyzer which consists essentially of a semi-permeable membrane, usually fabricated of cellulose, separating the blood from a suitable dialysis solution. A saline solution having about the same concentration and proportions of sodium, potassium, chloride, calcium, bicarbonate, magnesium and glucose as in normal plasma is usually employed as the dialysis solution. The solution is adjusted to and maintained at a pH of 7.4 by means of a bicarbonate, acetate and/or other physiologic buffer system; glucose is added to make the solution isotonic with blood. The membrane employed is impermeable to the blood proteins but is permeable to nitrogenous bodily waste products such as urea, uric acid and creatinine. These waste products pass from the blood to the dialysis solution across the membrane with a minimum disruption of the other constituents normally present in circulating blood.

An artificial lung device contains a dialyzer interposed in the blood circulation of a patient whose normal respiration has been interrupted, for example, while undergoing heart surgery. Blood circulates through the dialyzer which consists essentially of a semi-permeable membrane separating the blood from a suitable oxygen-bearing gas or solution. The membrane is impermeable to liquid but allows carbon dioxide to pass from the blood and oxygen to pass to the blood. When the oxygen source is a gas rather than a solution, membrane fabricated of a plastic such as polytetrafluoroethylene or a silicone rubber are generally employed. The gas is provided under pressure, preferably varying to correspond roughly to the normal respiration cycle.

The rate of removal of waste products including carbon dioxide from the blood depends on the efficiency with which the blood and the solution or gas contact each other across the semipermeable membrane. One approach has been to provide a large contact surface area of membrane per unit volume; prior art dialyzers have wound the membrane in a generally spiral configuration or have employed membrane stacks with separators inserted between membrane layers.

I have discovered that a high degree of efficiency at relatively low fluid flow rates is obtained in a dialysis apparatus wherein the contact surface consists of two closely spaced membranous discs, each supported on a field of cone-shaped elements. The apparatus also contains suitable inlet and outlet means providing for the radially outward flow of blood or first fluid between the membranes and for the generally parallel radially outward flow of a second fluid or gas in the spaces about the cone-shaped elements. The space between the membranes is tapered (broadest near the inlet, narrowest near the outlet) to compensate for the radial design of the apparatus and maintain a relatively uniform velocity for the first fluid as it flows through the apparatus. The plurality of substantially parallel flow paths for both fluids resulting from the radial design of the apparatus and the non-laminar flow in second fluid even at relatively low flow rates resulting from the configuration of the spaces around the cone-shaped elements, gives rise to a highly efficient yet comparatively compact dialysis unit.

It is, therefore, a principal object of the present invention to provide a dialysis apparatus particularly suitable for use in artificial kidney and artificial lung devices.

It is a further object of the invention to provide a hemodialyzer suitable for use at relatively low fluid flow rates.

These and other objectives and advantages of the present invention will become apparent on consideration of the dialysis apparatus more fully described in the following discussion and accompanying drawings, wherein:

FIG. 1 is a top view of an apparatus according to the invention with a portion broken away to illustrate the cone field;

FIG. 2 is a greatly enlarged fragmentary view of a portion of the cone field shown in FIG. 1;

FIG. 3 is a vertical sectional view along line 3—3 of FIG. 1;

FIG. 4 is an enlarged fragmentary detailed sectional view of one side of one section of the apparatus shown in FIG. 3;

FIG. 5 is an enlarged vertical sectional view along line 5—5 of FIG. 4;

FIG. 6 is an enlarged vertical sectional view along line 6—6 of FIG. 4; and

FIG. 7 is a vertical sectional view similar to that of FIG. 3 but with the central wafer portion removed.

The present invention is a dialysis apparatus comprising a housing, a pair of opposed generally disc-shaped members mounted in said housing, a plurality of spaced cone-shaped elements projecting from the opposed faces of the disc-shaped members, a pair of generally disc-shaped semipermeable membranes mounted in said housing and supported by the cone-shaped elements to define a first narrow space between the membranes tapering from the center radially outwardly and a second pair of spaces between the outer surfaces of the pair of membranes and about the cone-shaped elements, first fluid inlet and outlet means in said housing communicating only with the said first space defined by the said membranes adapted for the radially outward flow of a first fluid, and second fluid inlet and outlet means in said housing communicating only with the said second spaces about the said cone-shaped members adapted for the radially outward flow of a second fluid.

Referring now to the drawings in more detail, FIGS. 1 and 3 illustrate the overall structure of a dialysis apparatus according to the present invention. The apparatus consists of a sectional housing generally designated 11 held together by means of peripheral clamps 12 and a central clamping bolt 13. The upper, middle and lower wafer-like sections 11a, 11b and 11c of the housing 11 are sealed by means of horizontal O-rings and sealing members 14, 15, 16, 17, 18, 19, 20, 21 and 22. The apparatus is provided with upper and lower central inlet passages 23 and 23' for a first fluid and peripheral outlet passages 24 and 24' for removal of the first fluid. The apparatus is also provided with a lower central inlet passage 25 for a second fluid and an upper peripheral outlet passage 26 for that fluid. The housing is shown as containing two sets of disc-shaped members together with projecting cone-shaped elements. The upper set of disc-shaped members 27 and 30 have cone-shaped elements 28 and 31 projecting from opposing faces thereof. These elements independently support ring shaped semipermeable membranes 29 and 32. The lower set of disc-shaped members 27' and 30' similarly have projecting cone-shaped elements 28' and 31' supporting membranes 29' and 32'.

The cone-shaped elements 28 and 31 are regularly spaced and rounded at the top to avoid puncturing or tearing the membranes. These elements are conveniently fabricated by milling directly into the body of the corresponding disc-shaped members 27 and 30, preferably made of a deformable or elastomeric plastic, or by molding. As shown in FIG. 2, a generally triangular distribution of hexagonal-based cones 31 is obtained by milling three series of equally spaced parallel lines 33, 33' and 33" into the disc-shaped member 30, each set of lines being at an angle of 60° with respect to the other.

The flow paths within the apparatus for the first fluid and the second fluid are shown in FIGS. 3 and 4. There are two independent flow paths for the first fluid, each having its own inlet and outlet passages. First fluid for the upper half of the apparatus enters at inlet passage 23, passes through a first space 33 between semipermeable membranes 29 and 32 to collection ring 34 and exits via outlet passage 24. First fluid for the lower half of the apparatus follows a similar path entering at inlet passage 23', passing between semipermeable membranes 29' and 32' to collection ring 34' and exiting via outlet passage 24'.

While there is only one inlet passage 25 and outlet passage 26 for the second fluid, the fluid passes through the apparatus in four essentially parallel outwardly radial flow paths. Second fluid from inlet passage 25 divides and passes to annuli 36, 40 and 36' (via groove 35 to annuli 36 and 40) and thence to radial conduits 37, 41 and 37', respectively. Fluid from radial conduit 37 passes to annulus 38 and thence to a second fluid space 44 between disc-shaped member 27 and membrane 29 about cone-shaped elements 28, and exits via annulus 45, radial conduit 50 and outlet passage 26. Fluid from radial conduit 37' passes to annulus 43 and thence to a second fluid space between disc-shaped member 30' and membrane 29' about cone-shaped elements 28', and exits via annulus 49, radial conduit 50' and outlet passage 26. Fluid from radial conduit 41 divides and passes (a) to annulus 39 and thence to a second fluid space 44' between disc-shaped member 30 and membrane 32 about cone-shaped elements 31 and to annulus 46 and (b) to annulus 42 and thence to a second fluid space between disc-shaped member 27' and membrane 29' about cone-shaped elements 28', and to annulus 48; the fluid from annuli 46 and 48 recombines and exits via radial conduit 47 and outlet port 26.

As seen in FIG. 4, the first space 33 between the membranes 29 and 32 for the first fluid tapers from its more central inlet portion towards collection ring 34. The taper results from compression of the disc-shaped members at their outer edges, and functions to maintain a relatively uniform velocity in the first fluid as it flows radially outwardly in the first spaces between each of the membrane pairs.

The two opposing sets of cone-shaped elements 28 and 31 may approximate each other as illustrated in FIG. 5, or not approximate each other as illustrated in FIG. 6. The thin membranes 29 and 32, shown as being straight in FIG. 5, respond to the fluid pressures within the system. When the apparatus is in operation, the membranes distend between cone supports because of fluid pressure in the space 33 and generally exhibit a wave-like configuration as shown in FIG. 6. The fluid pressure in the first fluid space between the membranes must be greater than the fluid pressure in the second fluid spaces about the cone-shaped elements or the opposing membranes will be squeezed together and shut off flow of the first fluid.

The apparatus illustrated in FIG. 3 is fabricated of an upper, a middle and a lower section 11a, 11b and 11c for ready assembly. Each wafer-like section is of standard size and configuration and interchangeable with other like sections. The upper and lower sections 11a and 11c are so constituted that they are capable of mating to form a complete dialysis unit.

FIG. 7 illustrates a dialysis unit requiring less fluid and suitable for use as a hemodialyzer for children or infants, consisting of only a mated upper section 11a and lower section 11c. The unit contains only one pair of disc-shaped members 27 and 30', projecting cone-shaped elements 28 and 31', and semipermeable membranes 29 and 32'. The apparatus is provided as before with a lower inlet passage 25 for entrance of the second fluid and an upper outlet passage 26 for removal of the second fluid. Only one fluid path is utilized for the first fluid which enters an inlet passage 23 and exists via outlet passage 24.

The manifold system employed for supplying and removing first fluid from the first space between the membranes and from the second spaces between either membrane and the corresponding disc-shaped member in the above-described embodiments may be further modified by changing the location and number of inlet and outlet ports, the nature of sealing means employed and in other ways, provided only that the generally parallel radially outward flow of both fluids is maintained. When used as a hemodialyzer, the first fluid inlet ports are connected to the patient's arterial blood circulation and the first fluid outlet ports to his venous system. Arterial pressure forces the blood through the dialysis apparatus. Depending on whether the apparatus is being used as an artificial kidney or an artificial lung device the second fluid inlet port is connected to a source of dialysis fluid or an oxygen-containing gas. The material containing bodily waste products removed from the second fluid outlet port is not processed for reuse.

An apparatus 30 inches in diameter according to the present invention was constructed using cellophane membranes 1.5 thousandths of an inch thick and about 20 thousandths of an inch apart near the inlet tapering to 8 thousandths of an inch at the end of the dialysis area. The membranes were supported on hexagonal-based, cone-shaped elements 28 thousandths of an inch in height and 40 thousandths of an inch across at the base. There were about 625 cones per square inch of disc-shaped members in the dialysis area and about 2500 square inches of membrane available for dialysis.

Studies using blood as the first fluid showed that there was a very efficient exchange of solute between the first fluid and the second fluid across the cellophane membrane. Further studies with a dye dissolved in the second fluid showed that flow about the cones was highly turbulent due to the shape of the cones with respect to the overall path of flow of the second fluid. The increased efficiency of dialysis obtained in "scrubbing" waste products from the first fluid is attributed to the directed turbulence in the second fluid caused by impingement of the second fluid against the cone-shaped elements. About 8–10 hours operation as an artificial kidney approximates a week of normal kidney activity.

Certain preferred embodiments of the present invention have been disclosed for the purpose of illustrating the invention. It is evident that various changes and modifications may be made without departing from the scope and the spirit of the present invention. The invention is as described in the appended claims.

I claim:

1. A dialysis apparatus comprising a housing, a pair of opposed generally disc-shaped members mounted in said housing, a plurality of spaced cone-shaped elements projecting from the opposed faces of the disc-shaped elements, a pair of generally disc-shaped semipermeable membranes mounted in said housing and supported by the cone-shaped elements to define a first narrow space between the membranes tapering gradually and at a substantially constant rate for substantially the entire length thereof from the center radially outwardly and a second pair of spaces between the outer surfaces of the pair of membranes and the disc-shaped members, first fluid inlet and outlet means in said housing communicating only with the said first space defined by the said membranes adapted for the radially outward flow of a first fluid, and second fluid inlet and outlet means in said housing communicating only with the said second spaces about the said cone-shaped members adapted for the radially outward flow of a second fluid.

2. An apparatus according to claim 1 wherein the cone-shaped elements are rounded at the top and are regularly spaced on the disc-shaped members.

3. An apparatus according to claim 2 wherein the said elements are hexagonal-based cones triangularly distributed on the disc-shaped members.

4. An apparatus according to claim 1 wherein the housing contains two sets of disc-shaped members, cone-shaped elements and semipermeable membrane to define two sets of first spaces and second spaces, the first spaces being connecetd to different fluid inlet and outlet means and the second spaces being connected in parallel with the same fluid inlet and outlet means.

5. A hemodialysis apparatus comprising a housing, a pair of opposed generally disc-shaped members mounted in said housing, a plurality of spaced cone-shaped elements projecting from the opposed faces of the disc-shaped members, a pair of generally disc-shaped semipermeable membranes mounted in said housing and supported by the cone-shaped elements to define a first narrow space between the membranes tapering gradually and at a substantially constant rate for substantially the entire length thereof from the center radially outwardly and a second pair of spaces between the outer surfaces of the pair of membranes and the disc-shaped members, first fluid inlet and outlet means in said housing communicating only with the said first space defined by the said membranes adapted for the radially outward flow of a first fluid, and second fluid inlet and outlet means in said housing communicating only with the said second spaces about the said cone-shaped members adapted for the radially outward flow of a second fluid.

References Cited

UNITED STATES PATENTS 3,074,559   1/1963   Savino _____ 210—321

FOREIGN PATENTS 820,668   9/1959   Great Britain.
839,976   6/1960   Great Britain.

OTHER REFERENCES

Bramson et al.: "A New Disposable Membrane Oxygenator With Integral Heat Exchange," from Journal of Thoracic and Cardiovascular Surgery, vol. 50, No. 3, September 1965, received by Patent Office Feb. 18, 1966, pp. 391–400.

Peirce: "The Membrane Lung: A New Multiple Point Support for Teflon Film," from Surgery, vol. 52, No. 5, November 1962, pp. 777–783.

REUBEN FRIEDMAN, *Primary Examiner.*

F. SPEAR, *Assistant Examiner.*